June 9, 1953 — W. A. SIBINSKI ET AL — 2,641,221
FISH STOP FOR DAMS
Filed Sept. 22, 1950 — 2 Sheets-Sheet 1
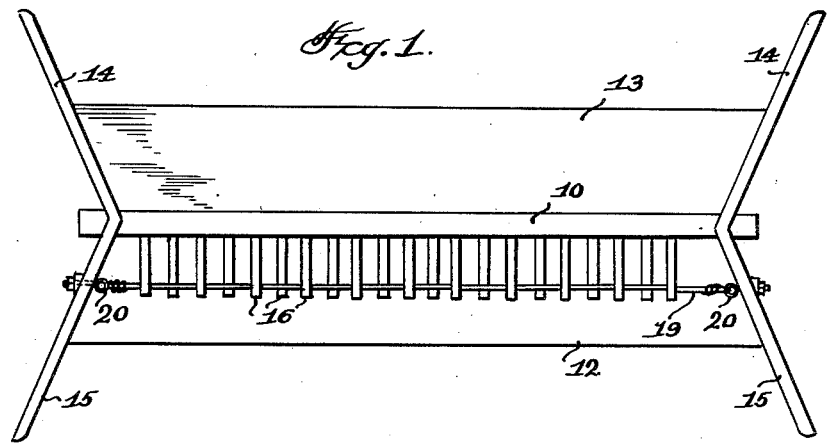
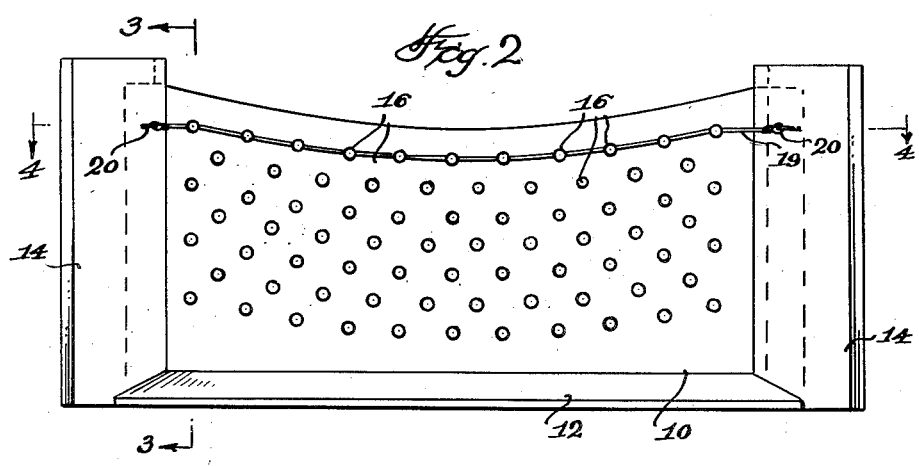
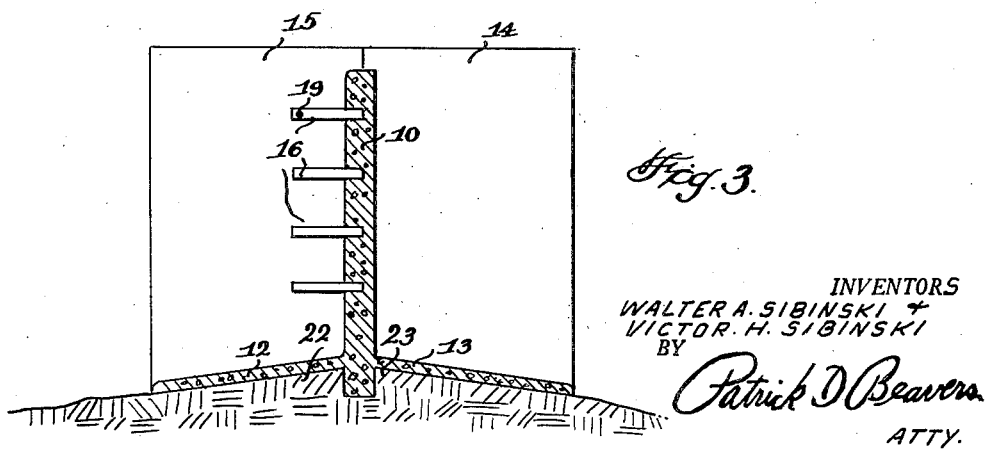
INVENTORS
WALTER A. SIBINSKI +
VICTOR H. SIBINSKI
BY
Patrick D. Beavers
ATTY.

June 9, 1953  W. A. SIBINSKI ET AL  2,641,221
FISH STOP FOR DAMS

Filed Sept. 22, 1950  2 Sheets-Sheet 2

INVENTORS
WALTER A. SIBINSKI &
VICTOR H. SIBINSKI
BY
Patrick D. Beavers
ATTY.

Patented June 9, 1953

2,641,221

UNITED STATES PATENT OFFICE 2,641,221

FISH STOP FOR DAMS

Walter A. Sibinski and Victor H. Sibinski,
Weyerhaeuser, Wis.

Application September 22, 1950, Serial No. 186,266

1 Claim. (Cl. 119—3)

The present invention relates to a fish stop for dams and it consists in the combinations, constructions and arrangements of parts herein described and claimed.

Generally there is provided a fish trap for dams which is designed to prevent fish from entering certain areas such as, for example, irrigation ditches, canal feeders or the like. The device consists simply of a vertically extending dam body preferably formed of concrete to the forward and rearward sides of which, adjacent each end thereof, are affixed forwardly and outwardly and rearwardly and outwardly extending side walls, to the lower portion of the front of the dam body there is affixed a forwardly and downwardly extending apron which is connected to the side walls adjacent thereto and to the lower portion of the rear face of the dam body there is affixed a rearwardly and downwardly extending apron which is likewise connected with its associated side walls. Embedded in the forward face of the body of the dam is a plurality of horizontally extending rows of pins which may take various forms in cross sectional area. The uppermost row of pins have extending therethrough adjacent their outer ends a cable which is fastened to the forward side walls whereby heavy objects passing over the dam will not disconnect such pins from the body of the dam. The pins are designed to prevent fish from swimming upwardly through the flow of water over the dam or from leaping over the dam.

It is accordingly an object of the invention to provide a device of the character set forth which is simple in construction, relatively inexpensive to manufacture and yet effective and efficient in use.

Another object of the invention is the provision of a novel fish stop for dams.

A further object of the invention is the provision, in a device of the character set forth, of a novel arrangement of pins forming a part of the invention.

A further object of the invention is the provision of novel retaining means for an uppermost row of pins forming a part of the invention.

Other and further objects of the invention will become apparent from a reading of the following specification taken in conjunction with the drawings, in which:

Figure 1 is a plan view of an embodiment of the invention,

Figure 2 is a front elevational view of Figure 1,

Figure 3 is a sectional view taken along line 3—3 of Figure 2,

Referring more particularly to the drawings, there is shown therein a vertically extending main dam body 10 which is adapted to lie transversely of a stream, ditch or the like as indicated at 11 and which is preferably formed of concrete.

Adjacent the bottom of the body 10 there is provided a forwardly and downwardly extending apron 12 and a rearwardly and downwardly extending apron 13. These aprons 12 and 13 are preferably formed integrally with the body 10 and of similar material.

Figure 4:
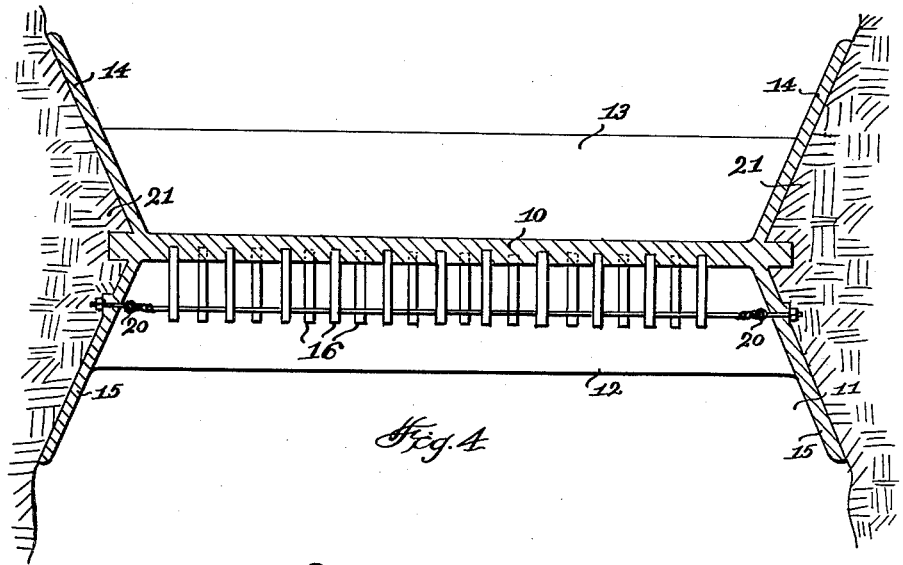
Figure 4 is a sectional view taken along line 4—4 of Figure 2.
Figures 5, 6:
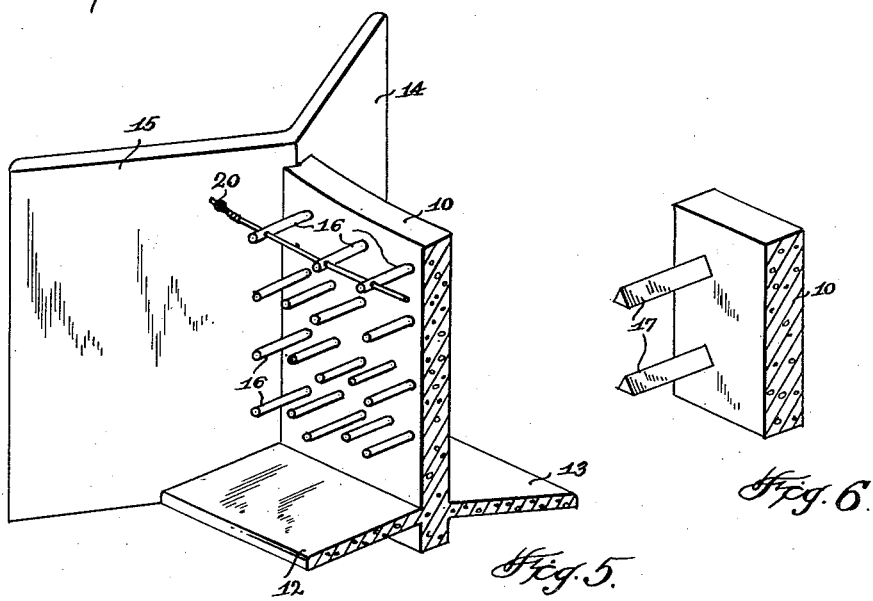
Figure 5 is a fragmentary perspective view of the portion of the device shown in Figures 1 to 4, inclusive.
Figure 6 is a fragmentary perspective view illustrating a modified form of pin structure.
Figure 7:
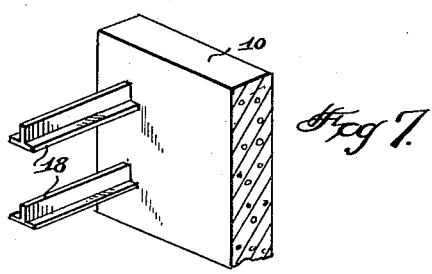
Figure 7 is a view similar to Figure 6 but showing a still further modification of pin structure.

Adjacent each side of the body 10 and preferably formed integrally therewith is an outwardly and rearwardly extending side wall 14 and an outwardly and forwardly extending side wall 15. The aprons 12 and 13 are preferably integrally connected with the side walls 15 and 14, respectively. Embedded in the front face of the body 10 are rows of horizontally disposed forwardly extending pins 16 which may be formed of cylindrical material such as pipe or the like as shown in Figures 1 to 5, inclusive, or may be triangular in cross sectional area, as shown at 17 in Figure 6 or again may be of inverted T-shape in cross sectional area, as indicated at 18, in Figure 7 of the drawings.

Extending through the outer portions of the uppermost row of pins is a flexible cable 19 which is anchored at each end, as indicated at 20, to the side walls 15.

In the operation of the device, it will be apparent that fish attempting to swim upwardly through a flow of water in the stream 11 will be impeded therefrom by the pins 16, 17 or 18, as the case may be. Likewise, when there is no flow of water in the stream 11, the pins will impede the progress of the fish to such an extent that they may not leap across the body 10 of the dam. The cable 19, being flexible in nature, will act to maintain the uppermost row of pins in position and prevent the same from becoming dislodged from the body 10 in the event that heavy objects should strike thereagainst. It will also be apparent that the walls 14 and 15 each being inclined outwardly away from the main body 10 of the dam, will act to maintain the dam securely in position since earth, indicated at 21, will fill in or may be filled in to the substantially triangular area encompassed by the walls 14 and 15. Again, and for the same reasons, the aprons 12 and 13, being inclined downwardly and outwardly from the body 10, and being joined at points above the lowermost end of the body 10 will act to maintain a body of earth between the lowermost end of the dam 10 and the apron 12, as indicated at 22, and a like body between the lowermost end of the dam 10 and the apron 13, as indicated at 23, to thus again insure the device against accidental movement after it has been properly positioned in the stream 11.

While but one form of the invention has been shown and described herein, it will be readily apparent to those skilled in the art that many minor modifications may be made without departing from the spirit of the invention or the scope of the appended claim.

What is claimed is:

A fish stop for dams comprising a vertically extending dam body and means for preventing fish from crossing said body, said means including horizontally extending rows of outwardly projecting pins affixed to the front side of said body, and a flexible cable anchored at its ends and extending through the outer portions of the uppermost row of said pins.

WALTER A. SIBINSKI.
VICTOR H. SIBINSKI.

References Cited in the file of this patent

UNITED STATES PATENTS

| Number | Name | Date |
| --- | --- | --- |
| 338,917 | Bloomer | Mar. 30, 1886 |
| 1,269,058 | Crisp et al. | June 11, 1918 |
| 1,515,547 | Burkey | Nov. 11, 1924 |
| 1,664,603 | Farrington | Apr. 3, 1928 |
| 1,672,947 | Lefforge | June 12, 1928 |
| 2,010,249 | Adams | Aug. 6, 1935 |